United States Patent [19]

Bogdan

[11] Patent Number: 5,120,283
[45] Date of Patent: Jun. 9, 1992

[54] HYDRAULIC AND GEAR TRANSMISSION

[76] Inventor: Lazarevic Bogdan, Mose Pijade 124/17, 26000 Pancevo, Yugoslavia

[21] Appl. No.: 700,408

[22] Filed: May 15, 1991

[51] Int. Cl.⁵ .................................................. F16H 47/04
[52] U.S. Cl. ........................................................ 475/72
[58] Field of Search ........................................ 475/72

[56] References Cited

U.S. PATENT DOCUMENTS 4,341,132  7/1982  Burdick .................... 475/72

FOREIGN PATENT DOCUMENTS

| | | | |
|---|---|---|---|
| 1500489 | 6/1969 | Fed. Rep. of Germany | 475/72 |
| 1755161 | 4/1970 | Fed. Rep. of Germany | 475/72 |
| 0023891 | 8/1970 | Japan | 475/72 |
| 0059060 | 3/1986 | Japan | 475/72 |
| 0113960 | 5/1987 | Japan | 475/72 |
| 0945533 | 7/1982 | U.S.S.R. | 475/72 |

*Primary Examiner*—Dirk Wright
*Attorney, Agent, or Firm*—Richard C. Litman

[57] ABSTRACT

A hydraulic and gear transmission includes a body having journaled therein axially aligned input and output shafts each having inner ends journaled relative one another. A carrier mounted on the output shaft supports a plurality of planet gears in engagement with a sun gear mounted on the input shaft inner end. Input motion as directed through the sun and planet gears, reacts with an outer most ring gear engaging the planet gears while the movement of this ring gear is controlled by the application of or absence of torque as applied to a variator gear also engaging the ring gear. Torque to the variator gear is regulated by a turbine gear attached thereto and which is activated by a pump gear driven by the input shaft.

4 Claims, 2 Drawing Sheets

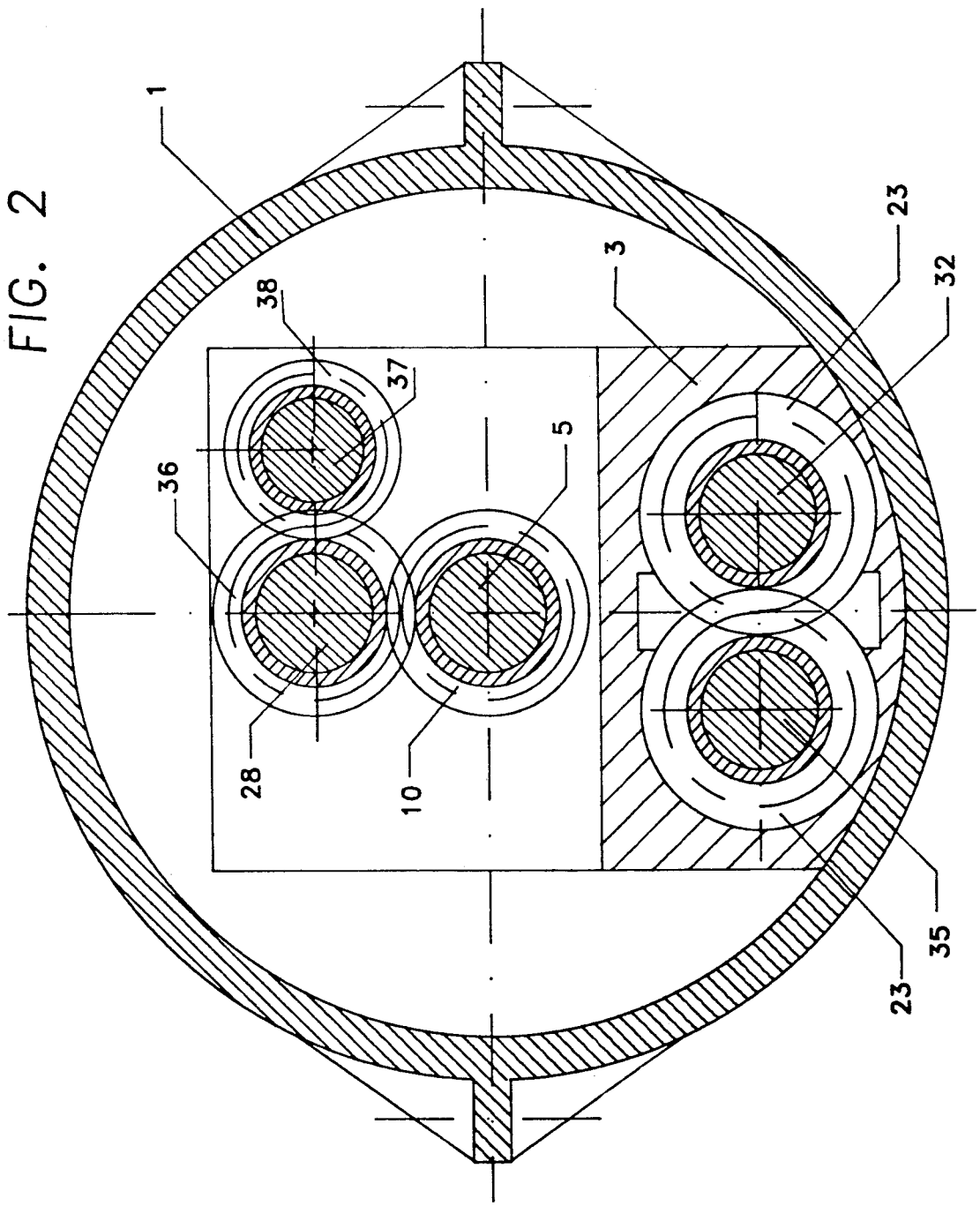

HYDRAULIC AND GEAR TRANSMISSION

FIELD OF THE INVENTION

The present invention relates generally to transmissions and more particularly, to an improved hydraulic and gear apparatus for increasing and/or reducing the output speed of a shaft as driven by a power source. Cars, buses, trucks, military vehicles, railway engines and electric motors employed for driving pumps, compressors, blowing devices, fans and mills can be supplied with variable speed transmissions for automatic vehicle speed control or the speed control of working machine shafts.

BACKGROUND OF THE INVENTION

Optimal vehicle and working machine acceleration depends on the difference between the driving engine available power and the power of total acceleration resistance. Multi-speed manual transmissions perform in a long acceleration period which affects the slow motion of vehicles and working machines, i.e., speed gain or loss provokes transmission gear shocks, so the total motion time is augmented while the general motion quality is lower. The working machine motors take the several times multiplied starting current, which affects unfavorably the electric power supply system control. Thus, the real technical problem is the optimal vehicle acceleration, optimal driving engine start, and working machine shaft revolving speed control.

DESCRIPTION OF THE PRIOR ART

All vehicles use transmission gears. They are operated by hand/foot or automatically. Their quality is developed up to the maximu, still they are not sufficiently improved. Hand operated transmissions require the driver's supplemental concentration and general vehicle speed is reduced. Turbine automatic transmissions are very good in operation, yet they are not widely used. The general opinion is that turbine transmissions with continuous shaft speed variation are not being used sufficiently.

SUMMARY OF THE INVENTION

By the present invention, an improved transmission is provided wherein the inner ends of axially aligned input and output shafts are journaled relative one another with the input shaft having a sun gear affixed thereto and in engagement with a plurality of planet gears in turn supported by a carrier affixed to the output shaft. While a ring gear engages the planet gears, it rotation is controlled by a variator gear that in turn engages the ring gear. The absence or amount of torque and its direction, as applied to the variator gear, is regulated by fluid pressure as controllably directed to a turbine gear connected to the variator gear.

Accordingly, one of the objects of the present invention is to provide an improved transmission including a variator gear engaged with a ring gear which in turn is engaged with planet gears driven by an input shaft sun gear and wherein movement and direction of the planet gears and an output shaft joined thereto, is regulated by controlling torque as applied by the variator gear.

Another object of the present invention is to provide an improved hydraulic and gear transmission employing fluid pressure as created by an input shaft pump gear, which pressure selectively operates a turbine gear to produce desired torque to a variator gear engaging a ring gear, in order to control the displacement of planet gears mounted on a carrier affixed to an output shaft.

BRIEF DESCRIPTION OF THE DRAWINGS

FIG. 2 is a cross-section, taken along the line A—A of FIG. 1.

Similar reference characters designate corresponding elements throughout the drawing figures.

DESCRIPTION OF THE PREFERRED EMBODIMENT

Figure 1:
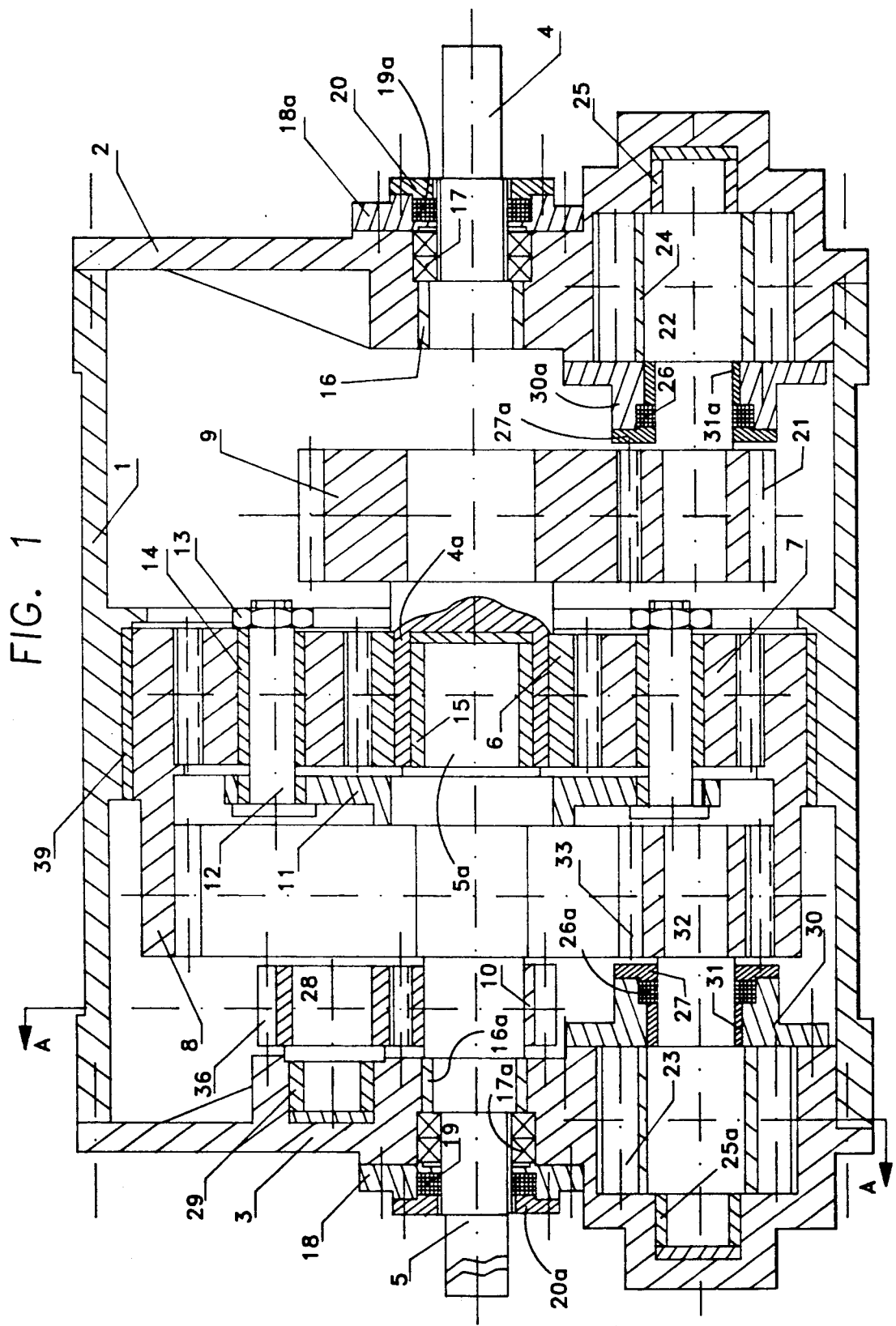
FIG. 1 is a longitudinal sectional view of the transmission according to the present invention.

The automatic variator, generally designated 100, comprises an apparatus for the automatic hydraulic and gear transmission of power from a driving engine or revolving electric motor shaft, to any desired device such as a vehicle or machinery item. FIGS. 1 and 2 illustrate the transmission construction including a main cylindrical peripheral body 1 enclosed at opposite ends by a rear hood 2 and front hood 3. The body 1 may include appropriate attachment devices to facilitate its mounting in the desired vehicle or other type of installation. Journaled within the rear hood, by means of journal bearing 16, and further supported by roller bearings 17, is an input shaft 4. An exteriorly accessible bearing cover 18a retains the bearings 17 and also serves as a seat for a seal 19a which is contained by an outermost seal cover 20. The input shaft 4 axially extends to an inner end 4a disposed in the medial area of the body 1.

Fixed to the input shaft 4, intermediate its two ends, is a main input gear 9, the teeth of which constantly engage a pump driving gear 21 affixed to a pump shaft 22. This shaft is part of a fluid pump gear 24 supported by the lower portion of the rear hood 2 by means of a rear journal bearing 25 and forward journal bearing 31a. The latter is fitted within a removable pump gear cover 30a, disposed within the interior of the main body 1 and will be seen to include a seal 26 retained by a seal cover 27a. Operation of the pump gear 24 will be understood to energize hydraulic fluid for operation of the instant apparatus. As is well practiced, a plurality of such pump gears 24 may be employed.

A sun gear 6, fixedly mounted on the inner end of the input shaft 4 will be seen to mesh with a plurality of planet gears 7 respectively mounted upon a carrier 11 with each planet gear 7 rotating on an individual shaft 12 supported by the carrier. This carrier 11 is fixedly attached to the output shaft 5, forward of its inner end 5a. A journal bearing 14 rotatably supports each planet gear 7 upon its shaft 12 while a nut 13 maintains the axial disposition of these components as shown in FIG. 1.

The output shaft 5 axially extends from the forward end 4a of the input shaft 4 with its rear end 5a supported within the input shaft end 4a, by means of first journal bearing 15. The forward or outer end of the output shaft 5 projects through the front hood 3 and is journaled therein by journal bearing 16a and further supported by roller bearings 17a. A front bearing cover 18 encloses the bearings and provides a seat for a seal 19 that is retained by a front seal cover 20a.

An internally toothed ring gear 8 surrounds the output shaft 5 and inner end 4a of the input shaft 4 and will be seen to be externally supported by a second journal bearing 39 and which is radially aligned with the plurality of planet gears 7 and is press fitted within the internal wall of the main body 1. The teeth of the planet gears 7 remain coupled with the rear portion of internal teeth on the ring gear 8.

The lower part of the front hood 3 provides a mount for a pair of adjacent, cooperating turbine gears 23 having the forward portion of their respective shafts 32,35 supported by means of journal bearings 25a while the rearward portion of the shafts are each supported by a journal bearing 31 carried by the turbine gear cover 30 disposed within the main body 1. This cover 30 also provides a seat for seals 26a retained by a seal cover 27. The turbine gear shaft 32 will be seen from FIG. 1 to extend rearwardly to support a variator gear 33 engaging the forward portion of the teeth on the ring gear 8. As the fluid pump gear 24 obviously will be driven in a constant direction of rotation upon rotation of the input shaft 4, well known switchable valve means (not shown) will be employed to selectively control and alter the delivery of hydraulic fluid output from the pump gear 24 to opposite ends of the turbine gears and thus determine the driven direction of rotation of the turbine gear shaft 32 and its variator gear 33. Typically, such fluid control is regulated by a distributor, such as a gear shift lever or the like.

The output shaft 4 carries an output gear 10 engaging with a drive gear 36, the shaft 28 of which is supported by a journal bearing 29 mounted in the upper portion of the front hood 3. As shown in FIG. 2, this drive gear 36 in turn drives a read-out gear 38 carried by a shaft 37 similarly supported by the front hood 3. As the read-out gear 38 will always be driven at a speed which is a direct function of the output shaft speed, suitable well known signal means may be controlled by this latter gear to provide the user with an indication of the current status of the RPM and direction of the output shaft 5.

The automatic transmission according to the present invention operates in four different modes. In one mode, the operator has manipulated his available distributor or mode selector lever to a neutral position and the engine or motor is rotating the input shaft 4 with its attached gear 9 and sun gear 6 obviously rotating at the same input shaft speed. Although the pump gear 24 is likewise in operation, the idle distributor setting merely recirculates the fluid output from the pump gear and thus, the pump turbine is not energized nor is the variator gear 33 subjected to torque by the turbing gear 23. With the sun gear rotating with the input shaft 4, the planet gears 7 will be rotating about their shafts 12 in an opposite direction and in view of the lack of any resistance from the variator gear 33, the ring gear 8 will in turn rotate in an opposite direction and with the output shaft 5 remaining at rest. Accordingly, in this mode it will be understood that the input shaft rotation is not being transmitted to the vehicle or device connected to the output shaft 5.

In another mode, with the associated vehicle at rest, the motor or engine driving the input shaft 4 is idling and although the operator's distributor or selector is in a drive or moving position, the pump gear 24 will be understood also to be operating at an idling RPM. The pump fluid pressure output correspondingly energizes the turbine gears 23 which transmit energy through the shaft 32 to the variator gear 33. However, as the resisting forces of the vehicle at rest are greater than the torque being applied to the variator gear 33, the vehicle remains at rest. In this mode, the sun gear 6 runs the planet gears 7 which run the ring gear 8 in the same direction.

In a third mode, the engine or motor is driving the input shaft 4 with power corresponding to the motion of the driven vehicle or the like, as in the case of a vehicle at cruise speed. The pump gear 23 is delivering fluid pressure corresponding to the vehicle motion with the turbine gears 23 operating the variator gear 33 at a torque greater than the resisting forces of the vehicle, were it at rest. Consequently, the ring gear rotation will be slowing down with the planet gears 7 beginning to move and rotate around the sun gear 6 in the same direction, while running the output shaft 5. As any additional power increases the RPM of the input shaft 4, the vehicle will accelerate. At a certain speed, when the resisting forces of motion create a resisting torque equal to the engine power torque, the vehicle will not be accelerating and the variator gear 33 will be running the planet gears 7 at a constant speed.

In a remaining mode, the output shaft 5 and thus, the vehicle, is driven in reverse. This is accomplished when the operator manipulates his distributor selector to energize the turbine gear 23 so as to run the variator gear 33 in the direction of ring gear rotation with the planet gears 7 rotating the opposite direction from the input shaft 4. Again, the speed of the associated vehicle will depend upon the supplied engine power to the input shaft 4.

It is to be understood that the present invention is not limited to the sole embodiment described above, but encompasses any and all embodiments within the scope of the appended claims.

I claim:

1. A hydraulic and gear transmission comprising:
   a substantially cylindrical hood bounded by opposite rear and front hoods,
   an input shaft journaled in said rear hood and having an inner end disposed within said body,
   a sun gear fixedly attached to said inner end of said input shaft,
   an output shaft journaled in said front hood and having inner end axially supported within said input shaft inner end by a first journal bearing,
   planet gears surrounding said input shaft and engaging said sun gear,
   a ring gear surrounding and engaging said planet gears and supported for rotation within said body by a second journal bearing wherein said first and said second journal bearings are both concentric with one another and substantially radially aligned with said input and output shaft inner ends, said sun gear, said planet gears, and said ring gear,
   a carrier mounting a plurality of shafts respectively supporting said planet gears,
   said carrier fixedly attached to said output shaft,
   a variator gear engaging said ring gear, and means controllable to regulate the rotation of said ring gear and accordingly the direction and degree of rotation of said carrier and output shaft.

2. A hydraulic and gear transmission according to claim 1 including,
   an input gear on said input shaft,
   a fluid pump gear driven by said input gear, and
   said controllable means including a fluid turbine gear driven in response to operation of said fluid pump gear.

3. A hydraulic and gear transmission according to claim 1 including,
   an output gear on said output shaft, and means driven by said output gear providing a readout of the operation of said output shaft.

4. A hydraulic and gear transmission according to claim 2 including,
- a driving gear intermediate said input gear and fluid pump gear,
- a common shaft supporting said driving gear and fluid pump gear adjacent opposite ends thereof, and
- a removable fluid pump gear cover within said body intermediate said fluid pump gear and driving gear.

* * * * *